United States Patent [19]

Dourson et al.

[11] Patent Number: 5,070,972
[45] Date of Patent: Dec. 10, 1991

[54] VORTEX VALVING ASSEMBLY FOR A HYDRAULIC DAMPER

[75] Inventors: Stephen E. Dourson, Dayton; Gary L. Johnston, Pleasant Hill, both of Ohio

[73] Assignee: General Motors Corporation, Detroit, Mich.

[21] Appl. No.: 539,245

[22] Filed: Jun. 18, 1990

[51] Int. Cl.⁵ .............................................. F16F 9/34
[52] U.S. Cl. ................................ 188/322.15; 92/85 B; 137/808; 137/833
[58] Field of Search ..................... 188/322.15, 322.14, 188/322.22, 320, 311, 264 AA, 319; 92/85 B; 91/399, 23; 137/808, 810, 833

[56] References Cited

U.S. PATENT DOCUMENTS

| | | | |
|---|---|---|---|
| 3,078,965 | 2/1963 | Bourcier de Carbon | 188/88 |
| 3,362,508 | 1/1968 | Mayer | 188/319 |
| 3,563,260 | 2/1971 | Ellis | 137/810 X |
| 3,621,952 | 11/1971 | Long, Jr. et al. | 188/322.15 X |
| 3,830,347 | 8/1974 | Fader et al. | 188/322 |
| 4,407,397 | 10/1983 | Fukushima et al. | 188/322.15 X |
| 4,418,802 | 12/1983 | Fukushima et al. | 188/282 |
| 4,438,833 | 3/1984 | Schafer | 188/320 |
| 4,442,925 | 4/1984 | Fukushima et al. | 188/322.15 X |
| 4,475,635 | 10/1984 | Iwata et al. | 188/282 |
| 4,502,575 | 3/1985 | Fukushima et al. | 188/282 |
| 4,515,252 | 5/1985 | Hidaka et al. | 188/322.15 X |
| 4,633,983 | 1/1987 | Horvath et al. | 188/322.14 |
| 4,853,574 | 8/1989 | Estague | 188/264 AA X |

Primary Examiner—Robert J. Oberleitner
Assistant Examiner—Peter M. Poon
Attorney, Agent, or Firm—A. Michael Tucker

[57] ABSTRACT

A vortex valving assembly for a hydraulic damper is adaptable for use in both a piston and a cylinder end. A generator plate includes a plurality of upstanding, arcuate vanes for imparting a vortex to passing fluid and directing the fluid to a central opening. A control plate having a plurality of openings is stacked adjacent the generator plate to control the entry and exit of fluid from the control plate during reciprocation of the piston.

8 Claims, 1 Drawing Sheet

VORTEX VALVING ASSEMBLY FOR A HYDRAULIC DAMPER

BACKGROUND OF THE INVENTION

1. Field of the Invention

The present invention relates generally to hydraulic dampers for vehicles and, in particular, is concerned with a vortex valving assembly for a piston and/or a cylinder end in a hydraulic damper.

2. Description of the Related Art

A typical hydraulic shock absorber or strut includes a piston and piston rod subassembly which reciprocates in an inner cylinder during compression and rebound of the damper. The piston may contain a valving assembly to vary the flow of hydraulic fluid from first and second chambers in the inner cylinder, resulting in desired damping characteristics.

The piston is generally formed as a metallic cylindrical member having an inner passage to receive the valving assembly and permit the flow of fluid between the first and second chambers. Oftentimes, the valving assembly is retained within the piston by a crimping procedure. Various components, e.g., orifices, springs and/or disks, of the valving assembly can be changed to select and tune the damping rate for a particular application.

A conventional base valve assembly is fitted to and seals the lower end of the inner cylinder. The base valve assembly controls the flow of fluid between the inner cylinder and a reservoir formed and bounded by a reservoir tube surrounding the inner cylinder. Various components, e.g., orifices, springs and/or disks, are utilized to select and tune the flow rate during reciprocation of the piston and piston rod subassembly.

The art continues to seek improvements. It is desirable to provide economical valving assemblies to control the flow of fluid in a hydraulic damper. Preferably, the valving assemblies are easily tunable and can be adapted for use with conventional pistons and inner cylinders.

SUMMARY OF THE INVENTION

The present invention includes an easily tunable valving assembly for hydraulic dampers. The valving assembly comprises two elements, a generator plate and a control plate, both of which are suitable for use with conventional pistons and inner cylinders. The generator plate includes a plurality of upstanding vanes for imparting a vortex to passing fluid, resulting in fluid resistance. The control plate includes a plurality of fluid ports for controlling the entry and exit of fluid through the generator plate. By altering the area and location of the ports in the control plate, various flow rates can be achieved by the valving assembly. Thus, a damper can be tuned for a desired damping performance by changing only the control plate.

In a preferred embodiment, the present invention includes a valving assembly for a hydraulic damper. A generator plate includes a plurality of upstanding, arcuate vanes for imparting a vortex to passing fluid and directing the fluid to a central opening. A control plate having a plurality of openings is stacked adjacent the generator plate to control the entry and exit of fluid from the control plate during operation of a damper.

DETAILED DESCRIPTION OF THE PREFERRED EMBODIMENTS

Figure 1:
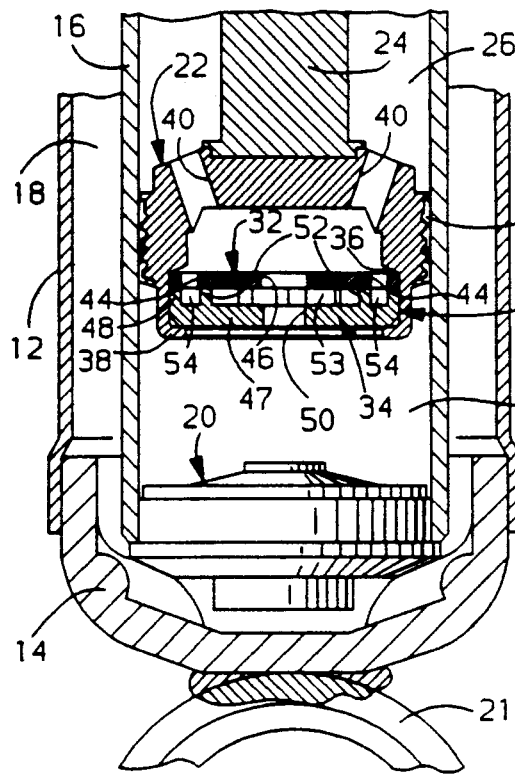
FIG. 1 is an axial sectional view of a shock absorber incorporating a piston having a vortex valving assembly according to the present invention.

A conventional twin-tube shock absorber for controlling the action of a vehicle suspension system is indicated generally at 10 in FIG. 1. The shock absorber 10 includes a reservoir tube 12 closed and sealed at its lower end by a base cup 14. The reservoir tube 12 is disposed around an inner cylinder 16. A fluid reservoir 18 is formed in the interior volume between the reservoir tube 12 and the inner cylinder 16. A well-known base valve assembly 20, seated in the base cup 14, closes the lower end of the inner cylinder 16 and controls the flow of fluid entering and exiting the reservoir 18 during operation of the shock absorber 10. A mounting ring 21 is secured to the outer surface of the base cup 14 and is secured to a wheel assembly (not illustrated) in a well-known manner.

A substantially cylindrical piston 22 is mounted on a lower end of a piston rod 24 in any suitable manner, e.g., welding. The piston rod 24 extends through an upper portion of the inner cylinder 16 and is mounted to a vehicle (not illustrated) in a well-known manner. The piston 22 divides the interior of the fluid-filled inner cylinder 16 into an upper chamber 26 and a lower chamber 28.

A vortex valving assembly indicated generally at 30 is secured within a lower portion of the piston 22. The valving assembly 30 includes a control plate indicated generally at 32 and a generator plate indicated generally at 34. The control plate 32 is peripherally secured against an inner locator shoulder 36 provided in the piston 22. The generator plate 34 is placed adjacent a lower surface of the control plate 32. An annular lower skirt 38 is coined or crimped radially inwardly against the lower surface of the generator plate 34 to retain the vortex valving assembly 30 within the piston 22.

A plurality of unrestricted fluid passages 40 are provided in the upper portion of the piston 22 and permit fluid flow as described below. A sealing band 42, preferably formed from polytetrafluoroethylene, is mounted about the circumference of the piston 22 and forms a seal against the inner surface of the inner cylinder 16. While the piston 22 and piston rod 24 are illustrated in the shock absorber 10, it is appreciated that these elements can be mounted in other hydraulic dampers, including struts.

Figure 2:
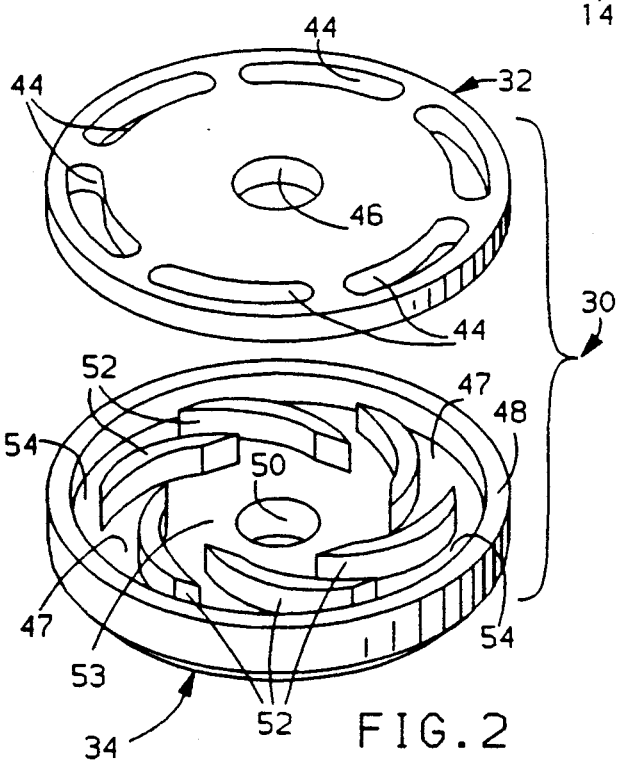
FIG. 2 is an enlarged exploded perspective view of the vortex valving assembly of FIG. 1 removed from the piston for purposes of clarity of illustration and illustrating a control plate and a generator plate.

As illustrated best in FIG. 2, the control plate 32 is a thin planar member having a plurality of arcuate openings 44 provided adjacent its outer periphery. In the embodiment illustrated in FIG. 2, a central opening 46 is also provided. The location and area of the openings 44 and 46 can be varied as described below.

The generator plate 34 includes a thin planar base 47 mounting an upwardly-projecting annular wall 48 at its periphery and having a central opening 50. A plurality of upstanding, arcuate vanes 52 are provided between the central opening 50 and the wall 48. Each vane 52 is aligned and curved so that it originates near the wall 48 and terminates near the central opening 50. An annular inner chamber 53 is formed in the interior volume between the vanes 52 and the central opening 50. An annular outer chamber 54 is provided between the vanes 52 and the wall 48.

When mounted in the piston 22 as illustrated in FIG. 2, the openings 44 of the control plate 32 are aligned with the annular chamber 54 of the generator plate 34. The central opening 46 of the control plate 32 is aligned with the central opening 50 of the generator plate 34. Preferably, the height of the vanes 52 is substantially equal to the height of the wall 48 so that the upper surfaces of the vanes 52 and the wall 48 provide mounting surfaces for the control plate 32.

In operation, the vortex valving assembly 30 controls the flow of fluid traveling through piston passages 40 between the upper and lower chambers 26, 28 in the inner cylinder 16. During the compression stroke, i.e., when the piston 22 and piston rod 24 travel toward the base valve assembly 20, fluid is forced from the lower chamber 28 through the base valve assembly 20 into the reservoir 18. Concurrently, a first portion of the fluid in the lower chamber 28 travels through the respective central openings 50, 46 of the generator plate 34 and the control plate 32 and the piston passages 40 to reach the upper chamber 26, while a second portion of the fluid travels through the central opening 50 and the inner chamber 53, between the vanes 52 to the outer chamber 54, and through the arcuate openings 44 to reach the upper chamber 26.

During the rebound stroke, i.e., when the piston 22 and the piston rod 24 move away from the base valve assembly 20, the majority of the fluid passing from the upper chamber 26 to the lower chamber 18 travels through the arcuate openings 44 into the annular chamber 54 between the wall 48 and the vanes 52. Fluid is directed or forced between the vanes 52 to swirl prior to exiting through the central opening 50 of the generator plate 34. This swirling motion creates a fluid vortex in the inner chamber 53, resulting in flow resistance. This resistance can be selected to produce a desired damping characteristic. Additionally, a portion of fluid travels from the central opening 46 of the control plate 32 through the central opening 50 of the generator plate 34 to pass to the lower chamber 28.

Figure 3:
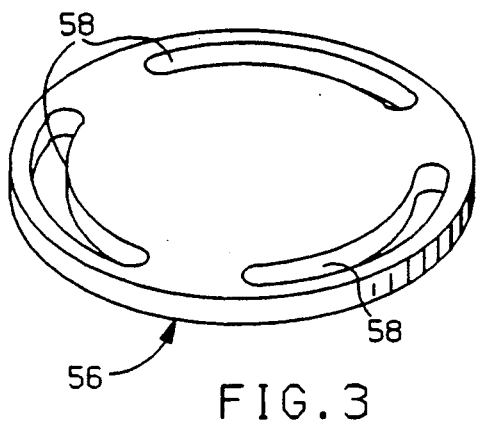
FIG. 3 is an enlarged perspective view of a second embodiment of a control plate for use with the vortex valving assembly, of FIGS. 1 and 2.

A desired damping characteristic can be achieved by varying the area and location of openings 44 and 46 in the control plate 32 without affecting the design of the generator plate 34. For example, a second embodiment of a control plate 56 is illustrated in FIG. 3. The control plate 56 is a thin planar member having a plurality of arcuate openings 58 selectively positioned in the plate. Note that the control plate 56 does not include a central opening as described with control plate 32. The area and location of openings 58 in the control plate 56 affects the flow through the generator plate 34, thereby producing a desired damping characteristic. If a greater area is provided near the central opening 50 of the generator plate 34, then more fluid will pass through the central opening 50 of the generator plate 34 without passing through the vanes 52.

It is understood that the diameter of the central opening 50 in the generator plate 34 can also be varied to alter the damping characteristic produced by the piston valving assembly 30. Furthermore, the shape, curvature and spacing of the vanes 52 can be preselected for desired flow rates. The shape, location and area of the openings 44, 46 and 58 in the respective control plates 32 and 56 can be varied from those illustrated in the figures.

Figure 4:
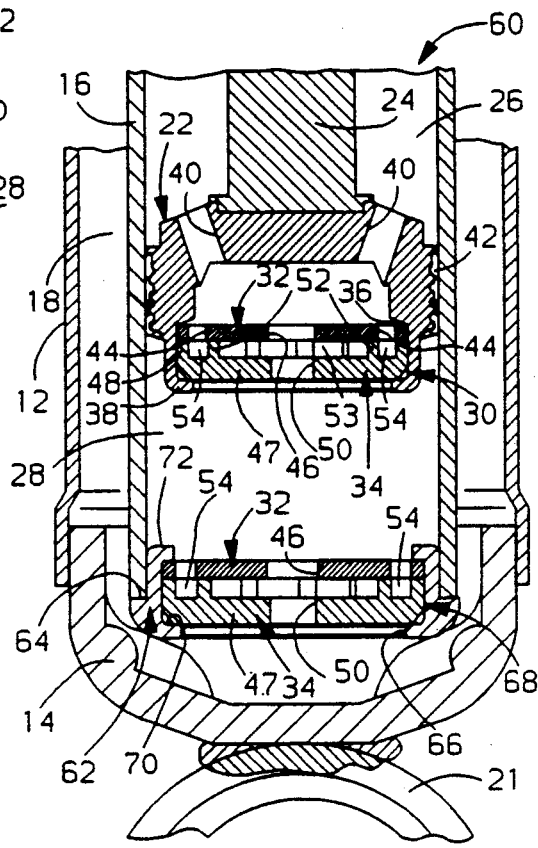
FIG. 4 is an axial sectional view of a second shock absorber incorporating the vortex valving assembly of FIG. 2 in both a piston and a cylinder end.

A second, twin-tube shock absorber indicated generally at 60 is illustrated in FIG. 4. For purposes of clarity, common elements of shock absorbers 10 and 60 are designated by the same reference numerals.

The shock absorber 60 includes a reciprocating piston 22 and piston rod 24 mounted in an inner cylinder 16. A reservoir 18 is formed in the interior volume between the reservoir tube 12 and the inner cylinder 16. A vortex valving assembly 30 is mounted in the piston 22 and controls fluid flow between the upper and lower chambers 26, 28 during operation of the shock absorber 60.

A generally cylindrical cylinder end 62 closes and seals the lower end of the inner cylinder 16. An annular, peripheral step 64 on the cylinder end 62 receives the inner cylinder 16 in a well-known manner. A central, axial opening 66 permits the passage of fluid between the lower chamber 28 and the reservoir 18 as described below.

A second vortex valving assembly indicated generally at 68 is secured within an upper portion of the cylinder end 62. The valving assembly 68 includes a control plate 32 and a generator plate 34. The generator plate 34 is peripherally secured against an inner locator shoulder 70 provided in the cylinder end 62. The control plate 32 is placed adjacent an upper surface of the generator plate 34. An annular upper skirt 72 is coined or crimped radially inwardly against an upper surface of the control plate 32 to retain the vortex valving assembly 68 within the cylinder end 62.

In operation, the first vortex valving assembly 30 controls fluid flow through the piston 22 as described above while the second vortex valving assembly 68 controls the fluid flow through the cylinder end opening 66. During the compression stroke, fluid in the lower chamber 28 is directed to arcuate openings 44 in the control plate 32 into the annular chamber 54 between the wall 48 and the vanes 52. Fluid is swirled between the vanes 52 creating a vortex in the inner chamber 53 prior to exiting through the central opening 50 into the reservoir 18. Additionally, a portion of fluid travels through the central openings 46 and 50 to the reservoir 18. During the rebound stroke, fluid travels back into the lower chamber 28 from the reservoir 18 through the central openings 46 and 50 and the arcuate openings 44.

The present vortex valving assemblies 30 and 68 disclose assemblies having no moving parts for controlling the flow of fluid through a shock absorber 10. The valving assemblies 30 and 68 can be adapted for conventional pistons and cylinder ends and can be tuned by altering only the area and position of openings 44 and 46 in the control plate 32. Thus, various damping characteristics can be achieved by changing the control plate 32. A vortex valving assembly 30, 68 can be used only in a piston 22, only in a cylinder end 62, or simultaneously in both the piston 22 and the cylinder end 62 of a shock absorber 60. Furthermore, a plurality of vortex valving assemblies can be stacked or mounted in series to provide a greater flow resistance in a first direction and a minimal flow resistance in a second direction. In other embodiments, a pair of vortex valving assemblies can be mounted in a "back-to-back" manner to provide a relatively high flow resistance in both directions.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A selectably-variable valving assembly for controlling fluid flow through a reciprocating piston of a hydraulic damper, comprising:
   (a) a generator plate having
      (i) a planar, circular base having a central opening,
      (ii) a plurality of upstanding vanes mounted on the base for directing fluid to the central opening,
      (iii) an upwardly-projecting wall provided at the periphery of the base,
      (iv) an annular outer chamber provided between the wall and the vanes, and
      (v) an annular inner chamber provided between the vanes and the central opening; and
   (b) a control plate, formed separately from and placed adjacent the generator plate, having a plurality of openings aligned with the annular outer chamber.

2. The valving assembly as specified in claim 1 wherein the vanes and the wall are substantially the same height.

3. A piston assembly for mounting on a reciprocal piston rod of a hydraulic damper, the piston assembly comprising:
   (a) a cylindrical member having internal passage means to permit the flow of fluid through the member; and
   (b) a valving assembly mounted on the cylindrical member for controlling the flow of fluid through the internal passage means including
      (i) a control plate having a plurality of openings, and
      (ii) a generator plate, formed separately from and placed adjacent the control plate, having a plurality of upstanding vanes and an upwardly projecting wall mounted on a planar base for directing fluid received from the control plate openings to a central opening in the generator plate.

4. The valving assembly as specified in claim 3 wherein the vanes and the wall are substantially the same height.

5. A cylinder end assembly for closing and sealing an inner cylinder of a hydraulic damper, the inner cylinder mounting a reciprocating piston, the cylinder end assembly comprising:
   (a) a cylindrical member having internal passage means to permit the flow of fluid through the member; and
   (b) a valving assembly mounted on the cylindrical member for controlling the flow of fluid through the internal passage means including
      (i) a control plate having a plurality of openings, and
      (ii) a generator plate, formed separately from and placed adjacent the control plate, having a plurality of upstanding vanes and an upwardly projecting wall mounted on a planar base for directing fluid received from the control plate openings to a central opening in the generator plate.

6. The valving assembly as specified in claim 5 wherein the vanes and the wall are substantially the same height.

7. A hydraulic damper, comprising:
   (a) a fluid-filled cylinder tube,
   (b) a piston rod reciprocally mounted in the cylinder tube,
   (c) a piston mounted on the piston rod and slidably mounted in the cylinder tube,
   (d) a fluid passage provided in the piston; and
   (e) valving means for controlling fluid flow through the fluid passage as the piston reciprocates with the piston rod in the inner cylinder, the valving means comprising
      (i) a control plate having a plurality of openings, and
      (ii) a generator plate, formed separately from and placed adjacent the control plate, having a plurality of vanes and an upwardly projecting wall mounted on a planar base for directing fluid received from the control plate openings to a central opening in the generator plate.

8. The hydraulic damper as specified in claim 7 including:
   (a) a cylinder end for sealing one end of the cylinder tube;
   (b) a fluid passage provided in the cylinder end;
   (c) valving means for controlling fluid flow through the cylinder end fluid passage as the piston reciprocates with the piston rod in the inner cylinder, the valving means comprising
      (i) a control plate having a plurality of openings, and
      (ii) a generator plate, formed separately from and placed adjacent the control plate, having a plurality of vanes and an upwardly projecting wall mounted on a planar base for directing fluid received from the control plate openings to a central opening in the generator plate.

* * * * *